United States Patent
Groninga et al.

(10) Patent No.: US 10,752,373 B2
(45) Date of Patent: Aug. 25, 2020

(54) AIR MANAGEMENT SYSTEMS FOR STACKED MOTOR ASSEMBLIES

(71) Applicant: Textron Innovations Inc., Providence, RI (US)

(72) Inventors: Kirk Landon Groninga, Keller, TX (US); Daniel Bryan Robertson, Southlake, TX (US)

(73) Assignee: Textron Innovation Inc., Providence, RI (US)

( * ) Notice: Subject to any disclaimer, the term of this patent is extended or adjusted under 35 U.S.C. 154(b) by 439 days.

(21) Appl. No.: 15/815,513

(22) Filed: Nov. 16, 2017

(65) Prior Publication Data

US 2019/0144126 A1 May 16, 2019

(51) Int. Cl.
| | |
|---|---|
| *B64D 33/08* | (2006.01) |
| *B64D 27/24* | (2006.01) |
| *B64D 35/08* | (2006.01) |
| *H02K 9/16* | (2006.01) |
| *H02K 5/20* | (2006.01) |
| *B64C 29/00* | (2006.01) |

(52) U.S. Cl.
CPC .......... *B64D 33/08* (2013.01); *B64C 29/0033* (2013.01); *B64D 27/24* (2013.01); *B64D 35/08* (2013.01); *H02K 5/20* (2013.01); *H02K 9/16* (2013.01)

(58) Field of Classification Search
CPC ........ B64D 33/08; B64D 35/08; B64D 27/24; B64D 33/04; H02K 5/20; H02K 9/16; B64C 29/0033; B64C 27/14
USPC ....................................................... 244/53 B
See application file for complete search history.

(56) References Cited

U.S. PATENT DOCUMENTS

| | | | | |
|---|---|---|---|---|
| 3,693,636 A | * | 9/1972 | Tomiati | A45D 2/36 132/229 |
| 3,779,282 A | * | 12/1973 | Klees | F02K 3/04 137/625.46 |
| 3,957,230 A | * | 5/1976 | Boucher | A63H 27/02 244/53 R |
| 2006/0016627 A1 | | 1/2006 | Robertson | |
| 2013/0026304 A1 | * | 1/2013 | Wang | B64C 29/0033 244/7 R |

FOREIGN PATENT DOCUMENTS

| | | |
|---|---|---|
| DE | 4413389 A1 | 12/1994 |
| DE | 202015106564 U1 | 3/2016 |
| JP | 2002130192 A | 5/2002 |

OTHER PUBLICATIONS

European Search Report; Application No. 17206154.1; European Patent Office; dated Jun. 6, 2018.

* cited by examiner

*Primary Examiner* — Christopher P Ellis
(74) *Attorney, Agent, or Firm* — Lawrence Youst PLLC (57) ABSTRACT

A stacked motor assembly for an aircraft includes a forward motor having an exhaust port and an aft motor disposed aft of the forward motor, the aft motor having an intake port. The stacked motor assembly includes an exhaust conduit originating from the exhaust port of the forward motor and disposed at least partially around the aft motor such that exhaust from the forward motor bypasses the aft motor. The stacked motor assembly also includes an intake conduit terminating at the intake port of the aft motor and disposed at least partially around the forward motor such that intake air for the aft motor bypasses the forward motor.

19 Claims, 6 Drawing Sheets

AIR MANAGEMENT SYSTEMS FOR STACKED MOTOR ASSEMBLIES

TECHNICAL FIELD OF THE DISCLOSURE

The present disclosure relates, in general, to air management systems for aircraft motors and, in particular, to air management systems for stacked motor assemblies that supply power to aircraft propulsion systems.

BACKGROUND

An electric motor may be used by aircraft as a power source for various functions, such as supplying rotational energy in an aircraft propulsion system. Some electric motors cool their internal electrical components using airflow, drawing ambient air into the motor and exhausting the warmed air out of the motor. In aircraft propulsion systems that utilize only a single motor, the lack of a backup motor increases the likelihood of a crash or other catastrophic condition should the motor fail. A single motor propulsion system also may not meet the power demands required by the propulsion system in the most efficient manner. Using two or more motors in a propulsion system addresses these concerns, but can give rise to an air management problem in which exhaust from one of the motors is ingested by another motor. The ingestion of exhaust by a motor may cause the motor to operate at an unacceptably high temperature, subjecting the motor's electrical components to higher thermal conditions and potentially affecting the life, performance and efficiency of the motor. This air management problem is exacerbated if one of the motors emits exhaust toward or proximate to the intake ports of another motor. Accordingly, a need has arisen for an air management system that allows for the redundancy and power advantages of utilizing two or motors in an aircraft system, while increasing motor efficiency by facilitating the flow of ambient, non-exhaust air into the motors.

SUMMARY

In a first aspect, the present disclosure is directed to a stacked motor assembly for an aircraft including a forward motor having an exhaust port and an aft motor disposed aft of the forward motor, the aft motor having an intake port. The stacked motor assembly includes an exhaust conduit originating from the exhaust port of the forward motor and disposed at least partially around the aft motor such that exhaust from the forward motor bypasses the aft motor. The stacked motor assembly also includes an intake conduit terminating at the intake port of the aft motor and disposed at least partially around the forward motor such that intake air for the aft motor bypasses the forward motor.

In some embodiments, the forward motor may include a plurality of exhaust ports and the aft motor may include a plurality of intake ports. In such embodiments, the exhaust conduit may include a plurality of exhaust conduits each originating from one of the exhaust ports of the forward motor, and the intake conduit may include a plurality of intake conduits each terminating at one of the intake ports of the aft motor. In certain embodiments, the exhaust conduits may include a plurality of structurally independent exhaust hoses, and the intake conduits may include a plurality of structurally independent intake hoses. In some embodiments, the forward motor may include a plurality of intake ports and the stacked motor assembly may include a forward endplate disposed forward of the forward motor. In such embodiments, the forward endplate may form a plurality of inner intake vents and a plurality of outer intake vents, the intake ports of the forward motor operable to receive intake air via the inner intake vents, the intake ports of the aft motor operable to receive intake air via the outer intake vents and the intake conduits. In certain embodiments, the intake conduits may each have a forward end coupled to the forward endplate proximate to a respective one of the outer intake vents. In some embodiments, the inner and outer intake vents may form substantially concentric circles.

In certain embodiments, the aft motor may include a plurality of exhaust ports and the stacked motor assembly may include an aft endplate disposed aft of the aft motor. In such embodiments, the aft endplate may form a plurality of inner exhaust vents and a plurality of outer exhaust vents, the exhaust ports of the aft motor operable to emit exhaust through the inner exhaust vents, the exhaust ports of the forward motor operable to emit exhaust through the outer exhaust vents via the exhaust conduits. In some embodiments, the exhaust conduits may each have an aft end coupled to the aft endplate proximate to a respective one of the outer exhaust vents. In certain embodiments, the inner and outer exhaust vents may form substantially concentric circles. In some embodiments, the forward motor may include a plurality of intake ports, the motors may have a common longitudinal axis and one of the motors may be rotatably disposed about the common longitudinal axis such that the motors are rotationally offset from one another and the intake ports of the forward motor are non-aligned with the intake ports of the aft motor. In certain embodiments, each of the motors may be cylindrically shaped. In some embodiments, the motors may be air-cooled electric motors. In certain embodiments, the motors may each have forward and aft ends, and the aft end of the forward motor may be adjacent to the forward end of the aft motor. In some embodiments, the exhaust conduit may include forward and aft ends. In such embodiments, the forward end of the exhaust conduit may be coupled to the exhaust port of the forward motor, and the aft end of the exhaust conduit may be proximate to the aft end of the aft motor. In certain embodiments, the intake conduit may include forward and aft ends. In such embodiments, the forward end of the intake conduit may be proximate to the forward end of the forward motor, and the aft end of the intake conduit may be coupled to the intake port of the aft motor.

In some embodiments, the exhaust conduit may have an aft end and may flare to increasing width toward the aft end. In certain embodiments, the stacked motor assembly may include a common drive shaft extending through the forward and aft motors. In such embodiments, the forward and aft motors may be operable to provide rotational energy to the common drive shaft. In some embodiments, the stacked motor assembly may include a housing partially or fully surrounding the motors. In such embodiments, the housing may form a plurality of bores extending therethrough, and the bores may include the intake and exhaust conduits. In certain embodiments, the housing may be cylindrically shaped. In some embodiments, the stacked motor assembly may include a tail cone protruding aft of the aft motor. In certain embodiments, the forward motor may include an intake port, and each of the motors may include an impeller. In such embodiments, the impeller of the forward motor may draw intake air through the intake port of the forward motor, and the impeller of the aft motor may draw intake air through the intake conduit and the intake port of the aft motor.

In a second aspect, the present disclosure is directed to an aircraft including a fuselage and a propulsion assembly supported by the fuselage. The propulsion assembly includes a stacked motor assembly, which includes a forward motor having an exhaust port and an aft motor disposed aft of the forward motor, the aft motor having an intake port. The stacked motor assembly includes an exhaust conduit originating from the exhaust port of the forward motor and disposed at least partially around the aft motor such that exhaust from the forward motor bypasses the aft motor. The stacked motor assembly also includes an intake conduit terminating at the intake port of the aft motor and disposed at least partially around the forward motor such that intake air for the aft motor bypasses the forward motor.

In some embodiments, the aircraft may be a tilting ducted fan aircraft and the propulsion assembly may include a plurality of ducted fans tiltable relative to the fuselage. In certain embodiments, the propulsion assembly may include a rotor hub assembly having a plurality of blade assemblies. In such embodiments, the stacked motor assembly may include a common drive shaft coupled to the rotor hub assembly and extending through the forward and aft motors, the forward and aft motors operable to provide rotational energy to the common drive shaft, thereby rotating the rotor hub assembly. In some embodiments, the power output, shape and size of the forward motor may be approximately equal to the power output, shape and size of the aft motor. In certain embodiments, the stacked motor assembly may include a forward endplate disposed forward of the forward motor. In such embodiments, the forward endplate may form one or more intake vents, and the intake ports of the motors may be operable to receive intake air via the intake vents. In some embodiments, the stacked motor assembly may include an aft endplate disposed aft of the aft motor. In such embodiments, the aft endplate may form one or more exhaust vents, and the exhaust ports of the motors may be operable to emit exhaust via the one or more exhaust vents.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
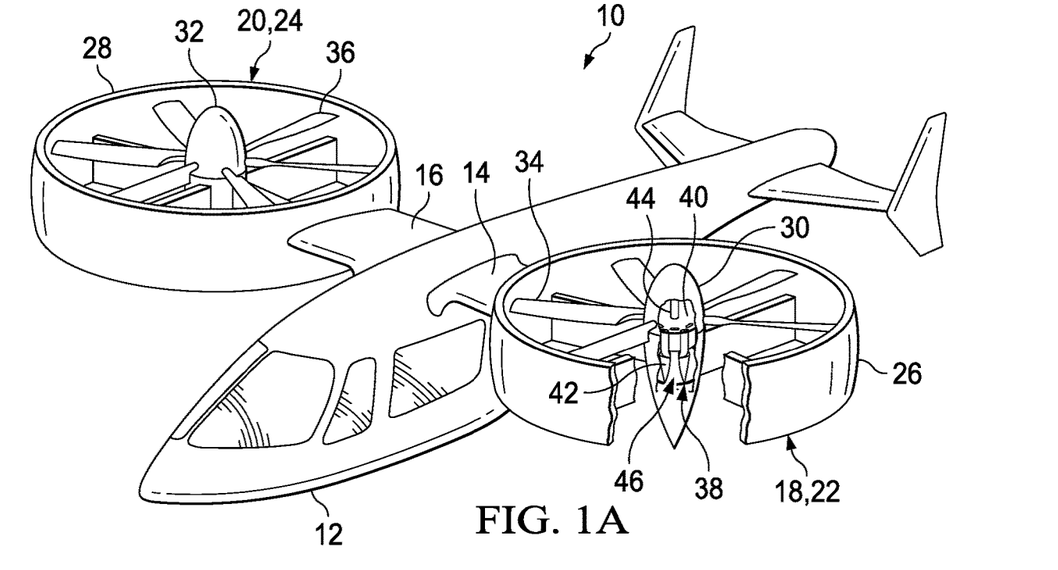
FIGS. 1A-1B are schematic illustrations of a tilting ducted fan aircraft utilizing stacked motor assemblies in accordance with embodiments of the present disclosure.
Figure 1B:
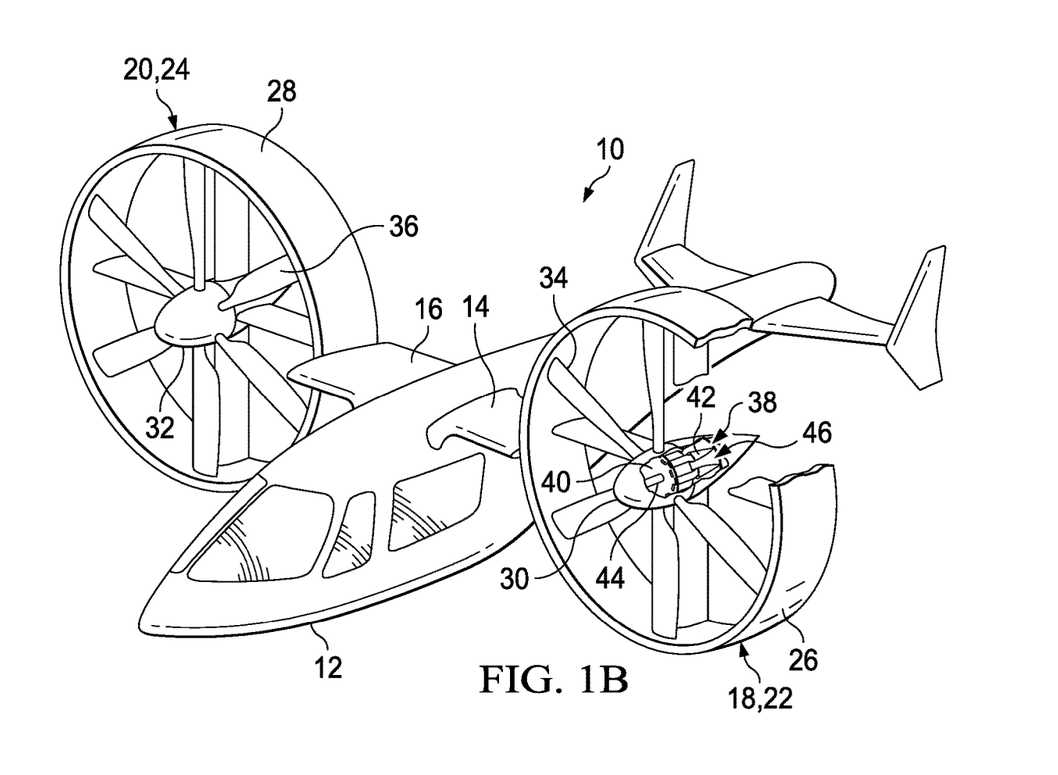

Referring to FIGS. 1A-1B in the drawings, a tilting ducted fan aircraft is schematically illustrated and generally designated 10. Tilting ducted fan aircraft 10 includes a fuselage 12. Left and right wings 14, 16 extend from the left and right sides of fuselage 12, respectively, although in other embodiments tilting ducted fan aircraft 10 may employ a single wing spanning both sides of fuselage 12. Fuselage 12 supports propulsion assemblies 18, 20, which are coupled to wings 14, 16, respectively. In particular, a left ducted fan 22 is rotatably coupled to the distal end of left wing 14. Likewise, a right ducted fan 24 is rotatably coupled to the distal end of right wing 16. Each ducted fan 22, 24 includes a duct 26, 28 that surrounds, or partially encloses, rotor hub assemblies 30, 32 from which a plurality of rotor blade assemblies 34, 36 radially extend, respectively. Rotor blade assemblies 34, 36 can be collectively manipulated to selectively control direction, thrust and lift of tilting ducted fan aircraft 10. Indeed, the collective pitch of rotor blade assemblies 34, 36 may be independently controlled from one another to allow for differential thrust output by ducted fans 22, 24. For example, the collective pitch of rotor blade assemblies 34 of ducted fan 22 may be higher or lower than the collective pitch of rotor blade assemblies 36 of ducted fan 24 such that the thrust generated by each ducted fan 22, 24 differs from one another.

Ducted fans 22, 24 are each tiltable, relative to fuselage 12, between a horizontal position, as shown in FIG. 1A, and a vertical position, as shown in FIG. 1B. Ducted fans 22, 24 are in the horizontal position during vertical takeoff and landing mode. Vertical takeoff and landing mode may be considered to include hover operations of tilting ducted fan aircraft 10. Ducted fans 22, 24 are in the vertical position during forward flight mode, in which tilting ducted fan aircraft 10 is in forward flight. In forward flight mode, ducted fans 22, 24 direct their respective thrusts in the aft direction to propel tilting ducted fan aircraft 10 forward. Tilting ducted fan aircraft 10 is operable to fly in all directions during the vertical takeoff and landing mode configuration of FIG. 1A, although faster forward flight is achievable while in the forward flight mode configuration of FIG. 1B. Ducted fans 22, 24 may be tiltable between the vertical and horizontal positions by a rotatable shaft (not shown) extending through wings 14, 16, and which are rotatable in response to commands originating from a pilot and/or a flight control system.

Propulsion assembly 18 utilizes a stacked motor assembly 38 as a power source to rotate rotor hub assembly 30. Stacked motor assembly 38 includes a forward motor 40 and an aft motor 42. A common drive shaft 44, which is coupled to rotor hub assembly 30, extends through forward and aft motors 40, 42. Forward and aft motors 40, 42 provide rotational energy to common drive shaft 44 to rotate rotor hub assembly 30. Forward and aft motors 40, 42 are each air-cooled electric motors that have a forward face, into which ambient, cooled air is drawn, and an aft face, out of which exhaust is emitted. Because forward and aft motors 40, 42 have a stacked configuration, in the absence of the illustrative embodiments, aft motor 42 is subjected to ingesting the exhaust emitted from forward motor 40, thus causing aft motor 42 to operate at a higher temperature, subjecting the internal electrical components of aft motor 42 to higher thermal conditions and potentially affecting the life, performance and efficiency of aft motor 42. The illustrative embodiments address this issue by providing an air management system 46, which includes one or more air conduits, to direct ambient cooling air to forward and aft motors 40, 42 while diverting exhaust emitted from forward motor 40 around aft motor 42. By facilitating the movement of air around and through a stacked motor assembly in each propulsion assembly 18, 20, tilting ducted fan aircraft 10 benefits from the capability of utilizing two motors for each propulsion assembly 18, 20, each of which harnesses boosted power and has redundancy in case one of the motors in the stacked motor assembly fails. Propulsion assembly 18, which includes stacked motor assembly 38 and air management system 46, is substantially similar to propulsion assembly 20, which also includes a stacked motor assembly and an air management system. Therefore, for sake of efficiency, certain features have been disclosed only with regard to propulsion assembly 18. One having ordinary skill in the art, however, will fully appreciate an understanding of propulsion assembly 20 based upon the disclosure herein of propulsion assembly 18.

It should be appreciated that tilting ducted fan aircraft 10 is merely illustrative of a variety of aircraft that can implement the embodiments disclosed herein. Indeed, stacked motor assembly 38, including air management system 46, may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, ducted fan aircraft having any number of ducted fans, tiltwing aircraft, including tiltwing aircraft having one or more interwing linkages, and the like. As such, those skilled in the art will recognize that stacked motor assembly 38, including air management system 46, can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2A-2H in the drawings, a stacked motor assembly is schematically illustrated and generally designated 100. Stacked motor assembly 100 includes forward motor 102 and aft motor 104 disposed behind or aft of forward motor 102. Forward and aft motors 102, 104 each have a forward end 106, 108 and an aft end 110, 112, respectively. Aft end 110 of forward motor 102 is adjacent or proximate to forward end 108 of aft motor 104. Forward and aft motors 102, 104 are air-cooled electric motors. Other types of fluid-cooled motors may also be used in stacked motor assembly 100. Forward and aft motors 102, 104 are each cylindrically shaped, but may have any shape or size in other embodiments. In one non-limiting example, forward and aft motors 102, 104 may each have a diameter in a range between 8 to 16 inches, such as 12 inches, and a depth in a range between 5 to 13 inches, such as 9 inches. The size of forward and aft motors 102, 104 may depend on the particular system in which stacked motor assembly 100 is utilized. Any model of electric motor may be used in stacked motor assembly 100. In one non-limiting example, forward and aft motors 102, 104 may be Safran electric motors having a power output in a range between 30 and 70 horsepower, such as 50 horsepower, or in a range between 20 and 50 kilowatts, such as 35 kilowatts. The model, power output, shape and size of forward motor 102 are approximately equal or similar to the model, power output, shape and size of aft motor 104. In other embodiments, the model, power output, shape and size of forward motor 102 may differ from the model, power output, shape and size of aft motor 104. Tail cone 114 protrudes aft of aft motor 104. In other embodiments, stacked motor assembly 100 may lack tail cone 114 and/or include a nose cone or spinner (not shown).

Figure 2A:
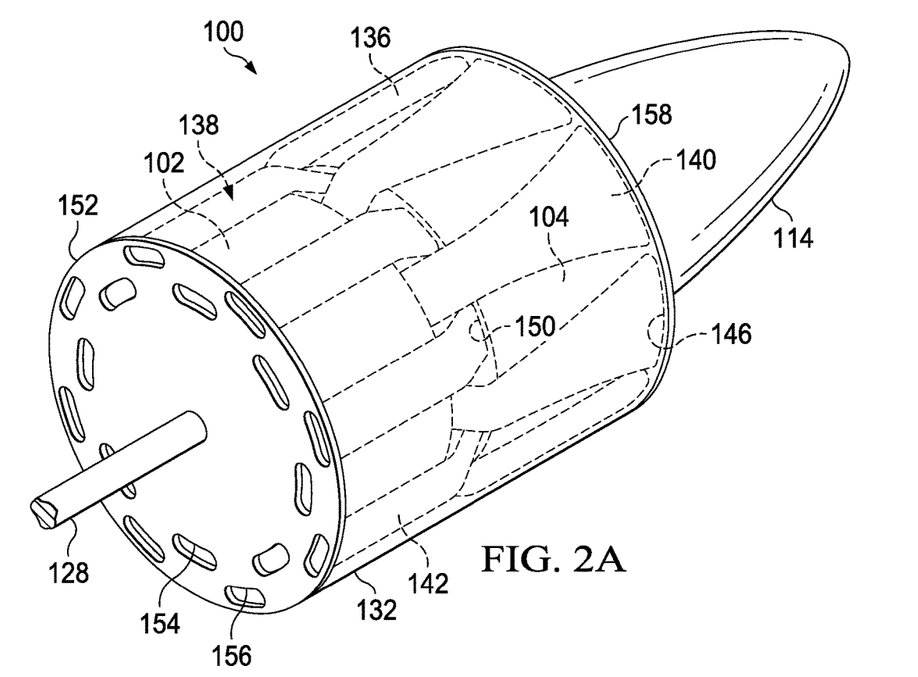
FIGS. 2A-2H are various views of a stacked motor assembly in accordance with embodiments of the present disclosure.
Figure 2B:
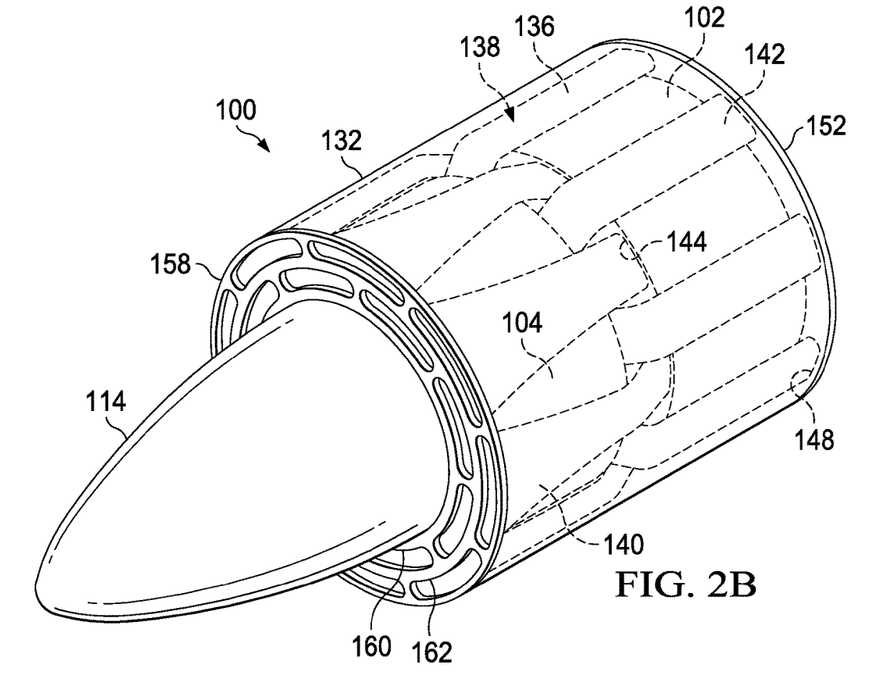
Figure 2C:
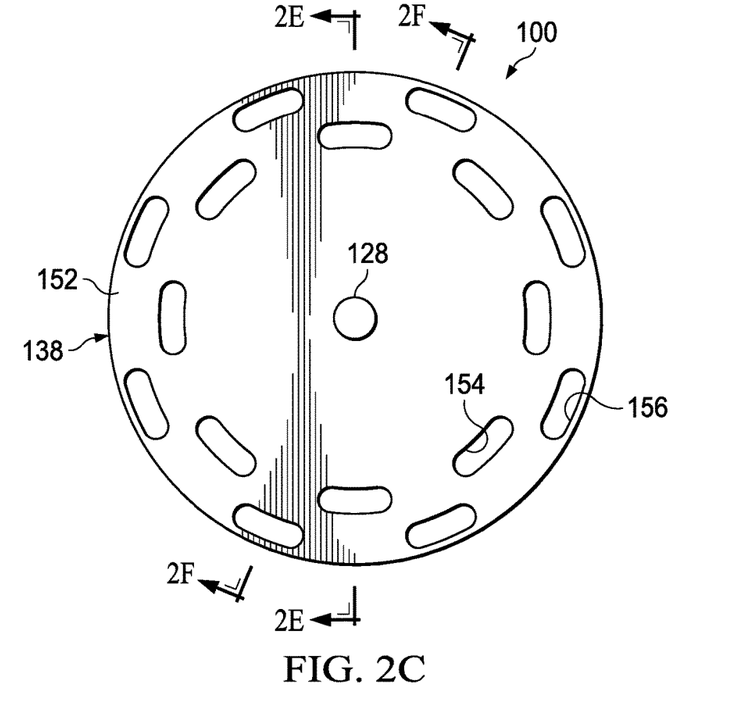
Figure 2D:
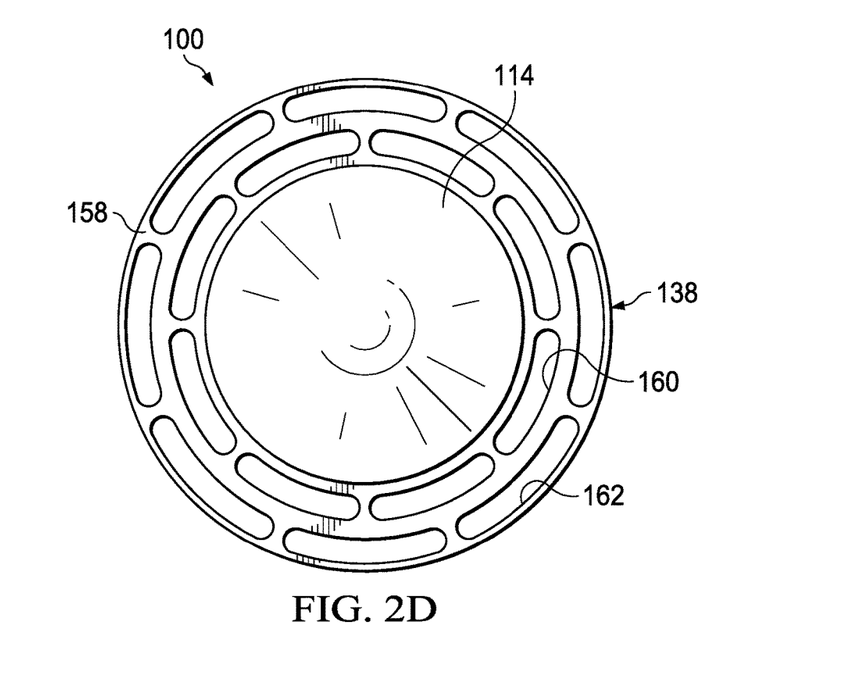
Figure 2E:
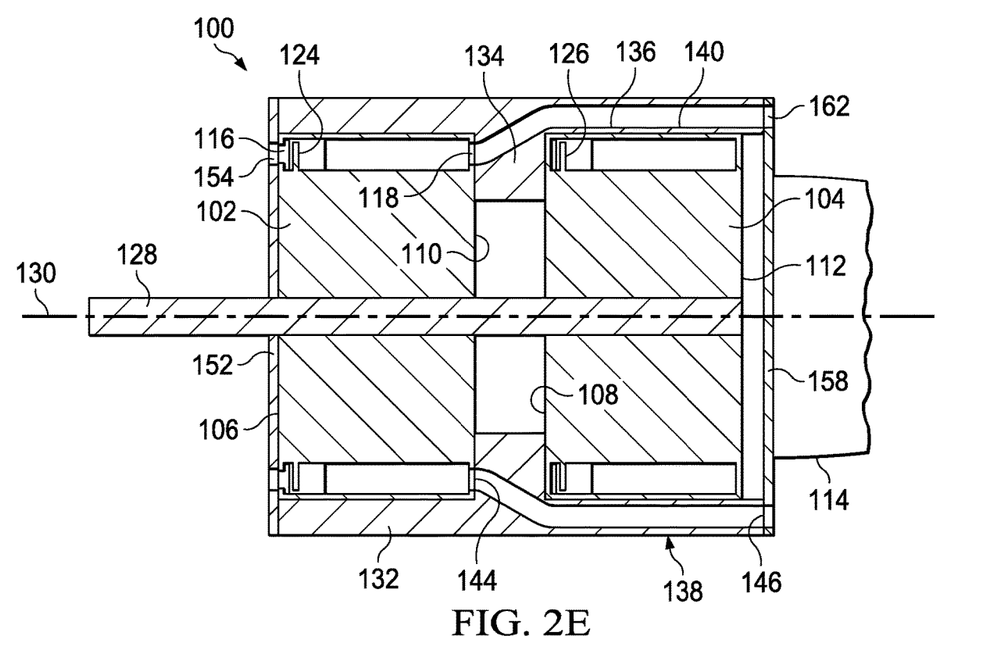
Figure 2F:
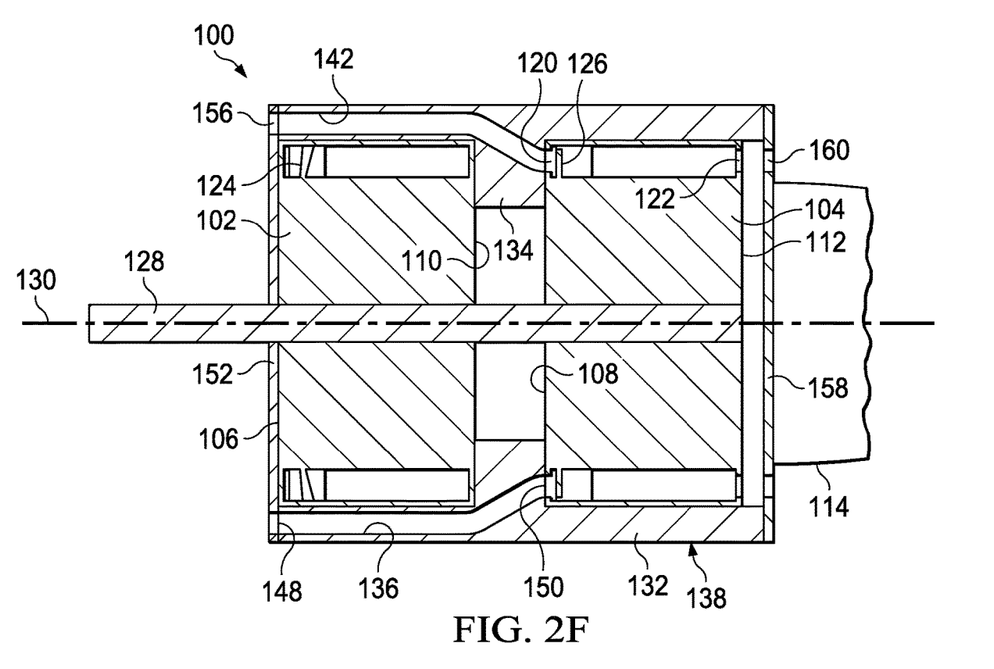
Figure 2G:
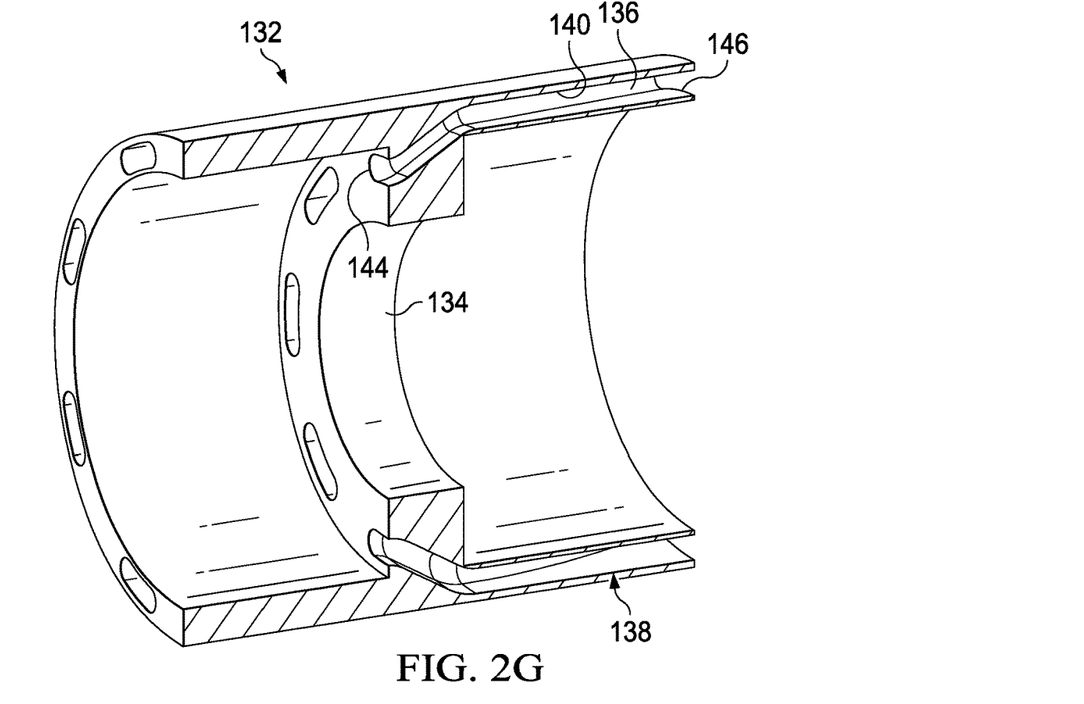
Figure 2H:
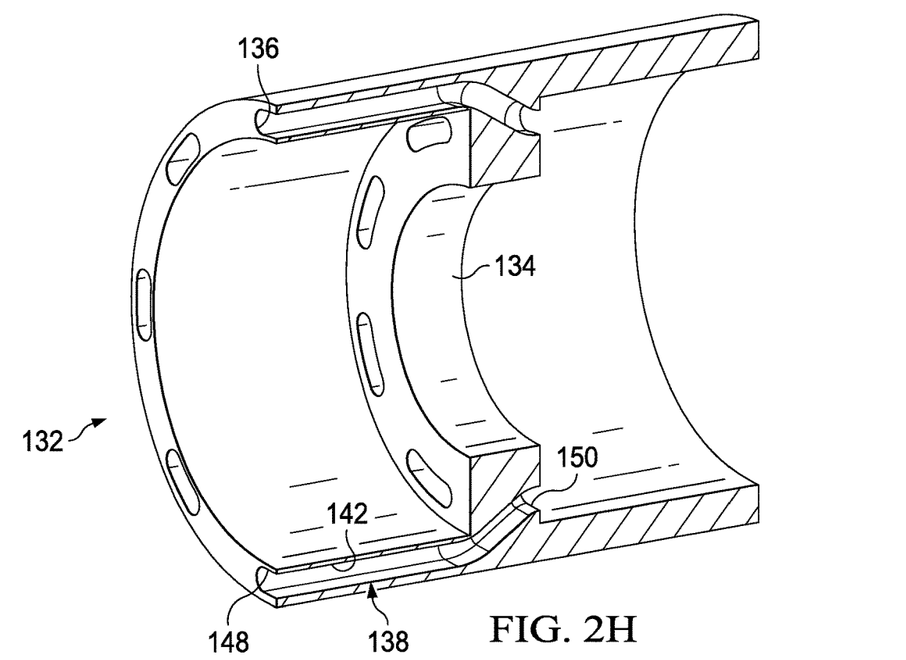

As best seen in FIG. 2E, forward end 106 of forward motor 102 includes intake ports 116 and aft end 110 of forward motor 102 includes exhaust ports 118. As best seen in FIG. 2F, forward end 108 of aft motor 104 includes intake ports 120 and aft end 112 of aft motor 104 includes exhaust ports 122. While forward and aft motors 102, 104 are each illustrated as having eight intake ports and eight exhaust ports, forward and aft motors 102, 104 may have any number of intake and exhaust ports. Forward and aft motors 102, 104 each include an impeller 124, 126, respectively. Impellers 124, 126 draw intake, or ambient, air through intake ports 116, 120 of forward and aft motors 102, 104, respectively, thereby cooling the internal electronics of forward and aft motors 102, 104 with airflow. Impellers 124, 126 may rotate with a common drive shaft 128, which extends through forward and aft motors 102, 104 along a central, and common, longitudinal axis 130 of forward and aft motors 102, 104. Forward and aft motors 102, 104 provide rotational energy to common drive shaft 128, which may be used to rotate any part of an aircraft, such as a rotor hub assembly. Common drive shaft 128 may be a single drive shaft extending through forward and aft motors 102, 104, or may be formed from two or more shaft segments coupled to one another.

Stacked motor assembly 100 includes a cylindrical housing 132 surrounding the sides of forward and aft motors 102, 104. Housing 132 is shown in isolation, in a cross-sectional isometric view, in FIGS. 2G and 2H. Housing 132 includes a spacer 134 that provides a predetermined amount of space between forward and aft motors 102, 104. Housing 132 includes bores 136 extending therethrough, which act as a manifold for an air management system 138. Bores 136 include exhaust conduits 140 and intake conduits 142. Each exhaust conduit 140 originates from a respective exhaust port 118 of forward motor 102 and is disposed at least partially around aft motor 104 such that exhaust from forward motor 102 bypasses, or is diverted around, aft motor 104. Each exhaust conduit 140 has a forward end 144 coupled to a respective exhaust port 118 of forward motor 102. Aft ends 146 of exhaust conduits 140 are proximate to aft end 112 of aft motor 104. Each intake conduit 142 terminates at a respective intake port 120 of aft motor 104 and is disposed at least partially around forward motor 102 such that intake air for aft motor 104 bypasses, or is diverted around, forward motor 102. Impeller 126 draws intake air through intake conduits 142 and intake ports 120 of aft motor 104. Forward ends 148 of intake conduits 142 are proximate to forward end 106 of forward motor 102. Each intake conduit 142 has an aft end 150 coupled to a respective intake port 120 of aft motor 104.

While the illustrated embodiment includes eight exhaust conduits 140 and eight intake conduits 142, air management system 138 may include any number of exhaust and intake conduits, which may depend on the number of intake ports 116, 120 and exhaust ports 118, 122 of forward and aft motors 102, 104. While exhaust conduits 140 and intake conduits 142 are shown to have a generally flat shape to contour the sides of forward and aft motors 102, 104, exhaust conduits 140 and intake conduits 142 may have any cross-sectional shape, such as a circular, elliptical, polygonal, irregular or other cross-sectional shape. Also, housing 132 may have any cross-sectional shape, such as an elliptical, polygonal, irregular or other cross-sectional shape.

Forward and aft motors 102, 104 are disposed within housing 132 such that forward and aft motors 102, 104 are rotationally offset, or clocked, relative to one another. Thus, intake ports 116 of forward motor 102 are not aligned with intake ports 120 of aft motor 104. Similarly, exhaust ports 118 of forward motor 102 are not aligned with exhaust ports 122 of aft motor 104. By rotationally offsetting forward and aft motors 102, 104 in this manner, exhaust conduits 140 and intake conduits 142 can be spatially disposed around forward and aft motors 102, 104 so as to not interfere or intersect with one another. To facilitate the emission of exhaust from forward motor 102, exhaust conduits 140 may flare to increasing width toward aft ends 146 of exhaust conduits 140.

Stacked motor assembly 100 includes a forward endplate 152, through which common drive shaft 128 is disposed. Forward endplate 152 is disposed forward of forward motor 102. Forward endplate 152 forms inner intake vents 154 and outer intake vents 156. Inner intake vents 154 and outer intake vents 156 form substantially concentric circles. Intake ports 116 of forward motor 102 receive intake air via inner intake vents 154. Intake ports 120 of aft motor 104 receive intake air via outer intake vents 156 and intake conduits 142. Each forward end 148 of intake conduits 142 is coupled to forward endplate 152 proximate to a respective one of outer intake vents 156.

Stacked motor assembly 100 also includes an aft endplate 158 disposed aft of aft motor 104. Aft endplate 158 forms inner exhaust vents 160 and outer exhaust vents 162, which form substantially concentric circles. Exhaust ports 122 of aft motor 104 emit exhaust through inner exhaust vents 160. Exhaust ports 118 of forward motor 102 emit exhaust through outer exhaust vents 162 via exhaust conduits 140. Each aft end 146 of exhaust conduits 140 is coupled to aft endplate 158 proximate to a respective one of outer exhaust vents 162. In some embodiments, tail cone 114 may protrude aft from aft endplate 158. Forward and aft endplates 152, 158 may have any shape or size dependent upon the shape and size of stacked motor assembly 100. In one non-limiting example, forward and aft endplates 152, 158 may each have a diameter in a range between 14 and 22 inches, such as 18.5 inches. Air management system 138 allows for end-to-end stacking of motors 102, 104. Stacked motor assembly 100, by virtue of having more than one motor, provides increased rotational energy to common drive shaft 128, as may be required in some propulsion systems. Stacked motor assembly 100 also provides redundancy in case either motor 102, 104 fails, thereby allowing for a safe landing in case of motor failure and preventing the aircraft from having to shut off other motors or propellers to maintain balance.

Figure 3:
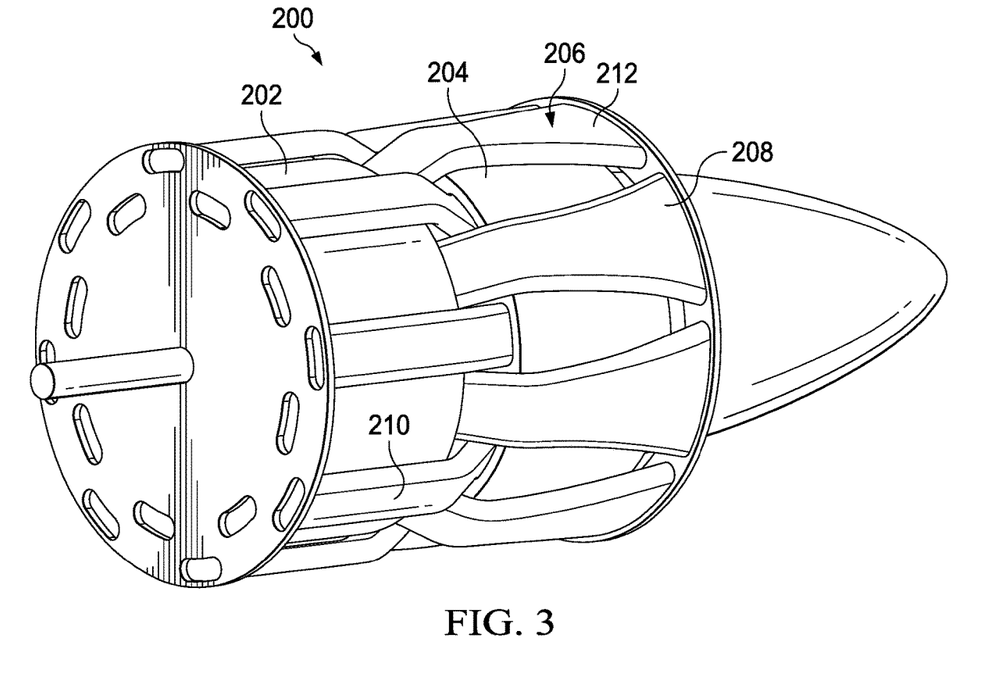
FIG. 3 is an isometric view of a stacked motor assembly in accordance with embodiments of the present disclosure.

Referring to FIG. 3 in the drawings, a stacked motor assembly for an aircraft is schematically illustrated and generally designated 200. Stacked motor assembly 200 includes forward and aft motors 202, 204 for which airflow is managed by air management system 206. In contrast to the embodiment illustrated in FIGS. 2A-2H, in which the exhaust and intake conduits are bored through a housing, exhaust conduits 208 and intake conduits 210 are structurally independent exhaust hoses and intake hoses, or plenums, respectively. Exhaust hoses 208 and intake hoses 210 may be formed and positioned so as to provide structural support to stacked motor assembly 200. Exhaust hoses 208 and intake hoses 210 may have any cross-sectional shape, such as the flattened contoured shape shown in FIG. 3 or a different shape. Aft ends 212 of exhaust hoses 208 are flared to facilitate the emission of exhaust from forward motor 202.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A stacked motor assembly for an aircraft comprising:
   a forward motor having an intake port and an exhaust port;
   an aft motor disposed aft of the forward motor, the aft motor having an intake port and an exhaust port;
   an exhaust conduit originating from the exhaust port of the forward motor and disposed at least partially around the aft motor such that exhaust from the forward motor bypasses the aft motor;
   an intake conduit terminating at the intake port of the aft motor and disposed at least partially around the forward motor such that intake air for the aft motor bypasses the forward motor;
   a forward endplate disposed forward of the forward motor, the forward endplate forming one or more intake vents, the intake ports of the motors operable to receive intake air via the one or more intake vents; and
   an aft endplate disposed aft of the aft motor, the aft endplate forming one or more exhaust vents, the exhaust ports of the motors operable to emit exhaust via the one or more exhaust vents.

2. The stacked motor assembly as recited in claim 1 wherein the forward motor further comprises a plurality of exhaust ports and the aft motor further comprises a plurality of intake ports;

wherein the exhaust conduit further comprises a plurality of exhaust conduits each originating from one of the exhaust ports of the forward motor; and wherein the intake conduit further comprises a plurality of intake conduits each terminating at one of the intake ports of the aft motor.

3. The stacked motor assembly as recited in claim 2 wherein the exhaust conduits further comprise a plurality of structurally independent exhaust hoses; and wherein the intake conduits further comprise a plurality of structurally independent intake hoses.

4. The stacked motor assembly as recited in claim 2 wherein the forward motor further comprises a plurality of intake ports; and wherein the forward endplate forms a plurality of inner intake vents and a plurality of outer intake vents, the intake ports of the forward motor operable to receive intake air via the inner intake vents, the intake ports of the aft motor operable to receive intake air via the outer intake vents and the intake conduits.

5. The stacked motor assembly as recited in claim 4 wherein the intake conduits each have a forward end coupled to the forward endplate proximate to a respective one of the outer intake vents.

6. The stacked motor assembly as recited in claim 2 wherein the aft motor further comprises a plurality of exhaust ports;

wherein the aft endplate forms a plurality of inner exhaust vents and a plurality of outer exhaust vents, the exhaust ports of the aft motor operable to emit exhaust through the inner exhaust vents, the exhaust ports of the forward motor operable to emit exhaust through the outer exhaust vents via the exhaust conduits.

7. The stacked motor assembly as recited in claim 6 wherein the exhaust conduits each have an aft end coupled to the aft endplate proximate to a respective one of the outer exhaust vents.

8. The stacked motor assembly as recited in claim 2 wherein the forward motor further comprises a plurality of intake ports;

wherein the motors have a common longitudinal axis; and wherein one of the motors is rotatably disposed about the common longitudinal axis such that the motors are rotationally offset from one another and the intake ports of the forward motor are non-aligned with the intake ports of the aft motor.

9. The stacked motor assembly as recited in claim 1 wherein the motors further comprise air-cooled electric motors.

10. The stacked motor assembly as recited in claim 1 wherein the motors each have forward and aft ends, the aft end of the forward motor adjacent to the forward end of the aft motor.

11. The stacked motor assembly as recited in claim 10 wherein the exhaust conduit further comprises forward and aft ends, the forward end of the exhaust conduit coupled to the exhaust port of the forward motor, the aft end of the exhaust conduit proximate to the aft end of the aft motor.

12. The stacked motor assembly as recited in claim 10 wherein the intake conduit further comprises forward and aft ends, the forward end of the intake conduit proximate to the forward end of the forward motor, the aft end of the intake conduit coupled to the intake port of the aft motor.

13. The stacked motor assembly as recited in claim 1 further comprising:

a common drive shaft extending through the forward and aft motors, the forward and aft motors operable to provide rotational energy to the common drive shaft.

14. The stacked motor assembly as recited in claim 1 further comprising:

a housing at least partially surrounding the motors, the housing forming a plurality of bores extending therethrough, the plurality of bores further comprising the intake and exhaust conduits.

15. The stacked motor assembly as recited in claim 1 further comprising:

a tail cone protruding aft of the aft motor.

16. The stacked motor assembly as recited in claim 1 wherein each of the motors further comprise an impeller, the impeller of the forward motor drawing intake air through the intake port of the forward motor, the impeller of the aft motor drawing intake air through the intake conduit and the intake port of the aft motor.

17. An aircraft comprising:

a fuselage; and a propulsion assembly supported by the fuselage, the propulsion assembly including a stacked motor assembly comprising:

a forward motor having an intake port and an exhaust port;

an aft motor disposed aft of the forward motor, the aft motor having an intake port and an exhaust port;

an exhaust conduit originating from the exhaust port of the forward motor and disposed at least partially around the aft motor such that exhaust from the forward motor bypasses the aft motor;

an intake conduit terminating at the intake port of the aft motor and disposed at least partially around the forward motor such that intake air for the aft motor bypasses the forward motor;

a forward endplate disposed forward of the forward motor, the forward endplate forming one or more intake vents, the intake ports of the motors operable to receive intake air via the one or more intake vents; and an aft endplate disposed aft of the aft motor, the aft endplate forming one or more exhaust vents, the exhaust ports of the motors operable to emit exhaust via the one or more exhaust vents.

18. The aircraft as recited in claim 17 wherein the aircraft further comprises a tilting ducted fan aircraft and wherein the propulsion assembly further comprises a plurality of ducted fans tiltable relative to the fuselage.

19. The aircraft as recited in claim 17 wherein the propulsion assembly further comprises a rotor hub assembly including a plurality of blade assemblies; and wherein the stacked motor assembly further comprises a common drive shaft coupled to the rotor hub assembly and extending through the forward and aft motors, the forward and aft motors operable to provide rotational energy to the common drive shaft, thereby rotating the rotor hub assembly.

* * * * *